(12) United States Patent
Hirata

(10) Patent No.: US 7,578,045 B2
(45) Date of Patent: Aug. 25, 2009

(54) METHOD OF MANUFACTURING A TRUNNION

(75) Inventor: Kiyotaka Hirata, Kanagawa (JP)

(73) Assignee: NSK Ltd., Tokyo (JP)

( * ) Notice: Subject to any disclaimer, the term of this patent is extended or adjusted under 35 U.S.C. 154(b) by 824 days.

(21) Appl. No.: 10/947,304

(22) Filed: Sep. 23, 2004

(65) Prior Publication Data
US 2005/0085339 A1    Apr. 21, 2005

(30) Foreign Application Priority Data
Sep. 25, 2003   (JP) ............... P.2003-333422

(51) Int. Cl.
*B23P 13/00* (2006.01)
(52) U.S. Cl. .......... 29/557; 82/1.11
(58) Field of Classification Search .......... 29/557, 29/558, 27 C, 27 R, 56.5, 26 A, 38 A, 38 B, 29/48.5 R; 476/40; 409/132, 131; 82/1.11
See application file for complete search history.

(56) References Cited

U.S. PATENT DOCUMENTS

| | | | |
|---|---|---|---|
| 6,174,258 B1 | 1/2001 | Imanishi et al. | |
| 6,224,508 B1 | 5/2001 | Nakano | |
| 6,344,013 B1 | 2/2002 | Itoh | |
| 6,415,508 B1 * | 7/2002 | Laps | 29/894.362 |
| 6,494,807 B1 | 12/2002 | Kamamura et al. | |
| 6,506,005 B2 * | 1/2003 | Kawai et al. | 409/131 |
| 7,261,668 B2 * | 8/2007 | Kamamura et al. | 476/40 |

FOREIGN PATENT DOCUMENTS

| | | |
|---|---|---|
| JP | 11-201250 A | 7/1999 |
| JP | 2002-172560 A | 6/2002 |
| JP | 2002-273603 A | 9/2002 |
| JP | 2002-336928 A | 11/2002 |

\* cited by examiner

*Primary Examiner*—Jermie E Cozart
(74) *Attorney, Agent, or Firm*—Sughrue Mion, PLLC

(57) ABSTRACT

A trunnion for toroidal continuously variable transmission, includes: an oblique surface, a bottom surface, an inclining shaft having an end surface and an inclining end surface, a pivot hole, an inner flat plane, and a crossing lubrication hole. The trunnion is obtained by supporting a trunnion material taking the oblique surface or the bottom surface as a machining reference and taking one of the end surface and the inclining end surface as an axial positioning reference, and by machining the trunnion material to form the inner flat surface, the pivot hole and the crossing lubrication hole of the trunnion while keeping the trunnion material retained.

4 Claims, 12 Drawing Sheets

PRIOR ART  FIG. 12
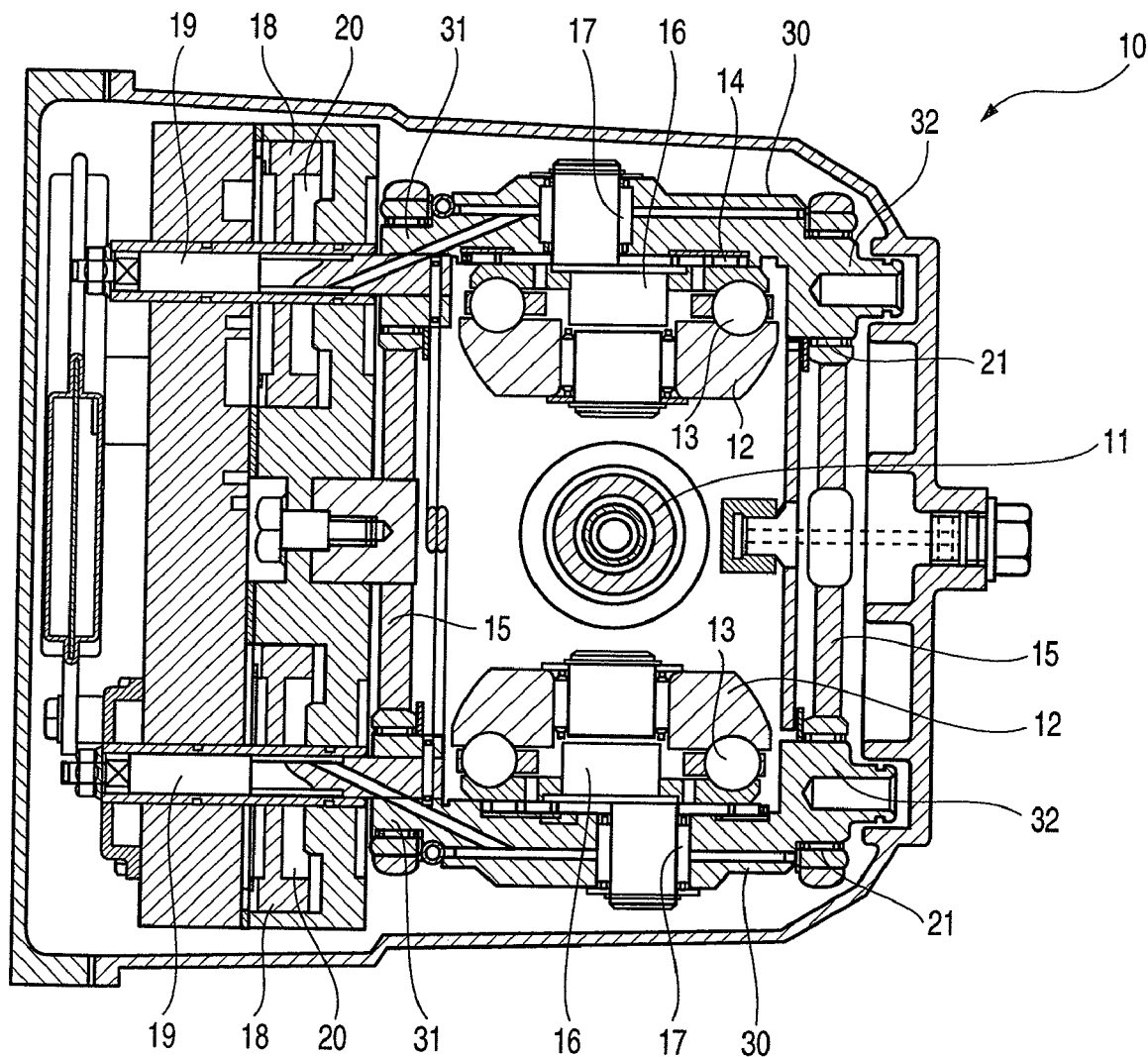

PRIOR ART

FIG. 16A
FIG. 16B
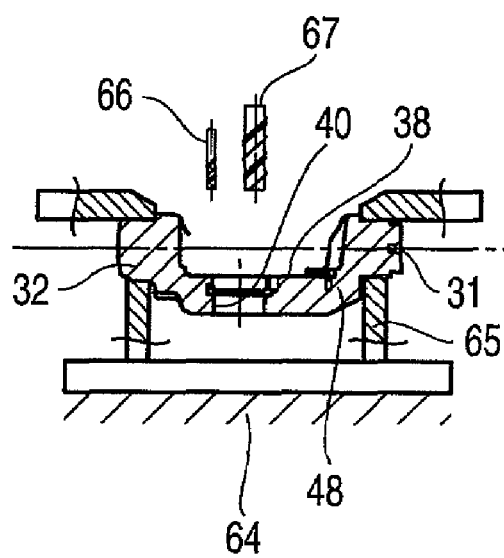
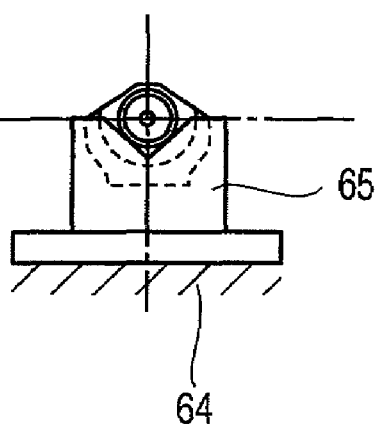
PRIOR ART
PRIOR ART

METHOD OF MANUFACTURING A TRUNNION

BACKGROUND OF THE INVENTION

1. Field of the Invention

The present invention relates to a trunnion used for a toroidal continuously variable transmission and a method of manufacturing the same.

2. Background Art

Hitherto, as a continuously variable transmission for use in vehicles such as automobile, there has been known a toroidal continuously variable transmission 10 as shown in FIG. 12. In the toroidal continuously variable transmission 10, an input disc and an output disc (not shown) which are provided in front of the transmission 10 and behind the transmission 10, respectively, as viewed on FIG. 12 are disposed on an input shaft 11 with their toroidal curves opposed to each other. A power roller 12 is pressed and clamped between the toroidal surface of the input disc and the output disc. In this arrangement, when the angle of inclination of the power roller 12 is continuously changed to vary the radius of the portion of the input disc and the output disc with which the power roller 12 comes in contact, the driving power can be transmitted from the input shaft 11 to an output shaft (not shown) with the transmission ratio being continuously varied.

The toroidal continuously variable transmission 10 also comprises trunnions 30 which respectively bear the power roller 12 via a thrust ball bearing 13 and a needle roller bearing 14 and rocks on a pair of inclining shafts 31, 32 which are born by a pair of supporting plates 15 in such an arrangement that they can freely rock and make axial displacement. At the center of the trunnion 30 is provided via a needle roller bearing 17 a displacement shaft 16 which rotatably bears the power roller 12. Connected to the inclining shaft 31, which is one of the inclining shafts of the respective trunnion 30, is a driving rod 19 having a driving piston 18 fixed at the middle point thereof. The driving piston 18 is fitted in a driving cylinder 20. In such an arrangement, when the pair of driving pistons 18 are displaced in opposite directions to cause the pair of trunnions 30 to rock in opposite directions, the angle of inclination of the power roller 12 varies.

As shown in FIGS. 13A-13D, the trunnion 30 comprises offset portions 33, 34 which constitute a pair of inclining shafts 31, 32 provided at the respective end thereof, respectively, and a body 35 connecting between the pair of offset portions 33, 34.

The outer surface of the body 35 comprises a flat bottom surface 36 and a pair of oblique surfaces 37 which respectively extend from the bottom surface 36 obliquely with respect to the width direction of the trunnion 30 (X-X direction in FIG. 13C). The pair of oblique surfaces 37 are each arranged apart from the central axis $O_1$ of the pair of inclining shafts 31, 32 at a distance r. On the other hand, the inner surface of the body 35 comprises an arc-shaped inner plane 38 disposed apart from and parallel to the central axis $O_1$ of the pair of inclining shafts 31, 32 at an offset s. The both axial ends of the body 35 (Z-Z direction in FIG. 13B) are formed flush with the inclining surface 39 of the pair of inclining shafts 31, 32 on the side close to the protruding offset portions 33, 34, respectively.

The body 35 has a pivot hole 40 formed at the middle portion thereof extending between the bottom surface 36 and the inner flat plane 38 for supporting the base of the displacement shaft 16 via the needle roller bearing 17. The center $O_2$ of the hole in the inner flat plane 38 and the center $O_3$ of the pivot hole 40 are positioned on the same level as the center $O_1$ of the pair of inclining shafts 31, 32.

Formed between the inner surface of the pair of the offset portions 33, 34 is a power roller pocket 41 surrounding the power roller 12. The power roller pocket 41 comprises a pair of arc-shaped steps 42 provided at the both axial ends of the inner flat planes 38 surrounding the sides of the needle roller bearing 14. At the step 42 on the inclining shaft 31 side thereof, a rocking stopper 43 is provided on the both crosswise ends of the trunnion 30 for limiting the rocking of a retainer (not shown) of the needle roller bearing 14.

The trunnion 30 also comprises a lubrication hole 44 provided therein for supplying a hydraulic fluid as a lubricant from the interior of the driving cylinder 20. The lubrication hole 44 comprises a first lubrication hole 45 disposed parallel to the central axis $O_1$ of the pair of inclining shafts 31, 32 and extending through the pivot 40, a second oblique lubrication hole 47 extending across a piston insertion hole 46 having the driving piston 18 fitted therein at the central portion of the inclining shaft 31 and connected to the first lubrication hole 45 and two crossing lubrication holes 48, 49 which are open to the inner flat plane 38 from the first lubrication hole 45. The center of the pair of crossing lubrication holes 48, 49 are positioned at the same level of the central axis $O_1$ of the pair of inclining shafts 31, 32.

Provided at the forward end of the inclining shaft 32 is a snap ring groove 50 on which a snap ring (not shown) for limiting the axial position of the needle roller bearing 21 disposed between the inclining shaft 32 and the supporting plate 15 is mounted. Provided on the inner surface of the offset portion 34 positioned inside the inclining end surface 39 is an inclination stopper 51 for limiting the maximum inclination of the trunnion 30.

On the other hand, on the part of the inclining shaft 31, provided at the offset portion 33 positioned inside the inclining end surface 39 are a wire groove 52 on which an endless wire (not shown) for synchronizing the inclination angle of a pair of opposing trunnions 30 is wound, a wire relief 53 provided between the wire grooves 52 in which an arc-shaped large diameter portion provided on the endless wire is fitted and a wire stopper 54 for fixing the endless wire to prevent the circumferential slippage of the endless wire.

As a method of producing the aforementioned trunnion 30 there has heretofore been known one described below.

A method is known which comprises forging the material to form the offset portions 33, 34 and the body 35 of the trunnion 30 for the purpose of enhancing the durability of the trunnion 30 (see U.S. Pat. No. 6,344,013). A method is also known which comprises forming the oblique surface 37 of the trunnion 30 by cold-working, and then utilizing the worked surface of the oblique surface 37 as a reference surface for trunnion working (see JP-A-2002-336928). A method is further known which comprises forming the wire stopper 54 at the offset portion 33 of the trunnion (see U.S. Pat. No. 6,224,508). A method is still further known which comprises forming the inner flat plane 38, the pivot hole 40 and the power roller pocket 41 of the trunnion 30 by lathe turning to enhance the working efficiency (see U.S. Pat. No. 6,494,807).

As related art methods of forming trunnion there have been methods as shown in FIGS. 14A to 16B.

Firstly, a trunnion material is forged into an outline provided with a proper work margin. At the subsequent step shown in FIGS. 14A and 14B, the trunnion material 30 thus forged is placed on a supporting table 60 with the oblique surface 37 as a work reference and pressed by a clamp 61 at the inner flat plane 38 so that it is retained on the main shaft 62 of a lathe. In this arrangement, the trunnion material is then lathe-turned by a lathing bite 63 to form one of the inclining shafts (inclining shaft 31) and one of the inclining end surfaces (inclining end surface 39).

At the subsequent step of forming the other inclining shaft 32 by lathe-turning as shown in FIGS. 15A and 15B, the forged trunnion material is again pressed at the inner flat plane 38 by the clamp 61 with the other inclining shaft 32 positioned there outside so that it is retained on the main shaft 62 of the lathe. In this arrangement, the trunnion material is then lathe-turned by the lathing bite 63 to form the other inclining shaft 32 and the other inclining end surface 39 with the oblique surface 37 that is also forged, as a work reference.

At the subsequent step shown in FIGS. 16A and 16B, the pair of inclining shafts 31, 32 thus turned are fixed to a fixture such as V-shaped receiving portion 65 provided on a machining center table 64. In this arrangement, the material is then milled by machining tools 66, 67 to form the inner flat plane 38, the pivot hole 40 and the crossing lubrication holes 48, 49 with the inclining shafts 31, 32 as a work reference.

SUMMARY OF THE INVENTION

However, the working method shown in FIGS. 14A to 16B includes forming one inclining shaft 31 with the forged surface of the material as a work reference, unclamping the trunnion 30, and then forming the other inclining shaft 32 again with the forged surface of the material as a work reference. Therefore, a portion on the forged surface of the material having a poor precision in geometrical shape must be used as a work reference, causing the drop of precision in positioning of the trunnion 30 and hence precision in coaxiality of the pair of inclining shafts 31, 32 thus formed.

At the step of forming the inner flat plane 38, the pivot 40 and the crossing lubrication holes 48, 49, the trunnion 30 is retained on the V-shaped receiving portion 65 with the inclining shafts 31, 32 as a work reference. However, the external dimension of the inclining shafts 31, 32 has some work error. Therefore, when there is some difference in external dimension between the inclining shafts 31, 32, the trunnion 30 is retained with the center of the inclining shafts inclined toward the direction perpendicular to the shafts. When working is made under these conditions, the precision in offset s or the parallelism between the inner flat plane 38 thus formed and the center of the inclining shafts is deteriorated.

For the same reason, also when the other functional portions of the trunnion 30 are formed with the inclining shafts 31, 32 as a work reference, the precision in positional relationship is deteriorated.

JP-A-2003-336928 cited above discloses the use of an oblique surface formed by cold-working as a work reference but has no reference to what portions should be worked. U.S. Pat. No. 6,224,508 as cited above, which discloses a method of forming wire stopper, has no reference to what portion should be a work reference. U.S. Pat. No. 6,494,807 as cited above, which discloses a method of forming trunnion, has no detailed description of work reference to be used in working.

It is an object of the invention to provide a method of forming a trunnion for toroidal continuously variable transmission which can produce a trunnion with a high precision at reduced cost without increasing the number of kinds of machining tools in the light of the aforementioned problems.

To achieve the object, the invention provide a trunnion for toroidal continuously variable transmission, including: an oblique surface; a bottom surface; an inclining shaft having an end surface and an inclining end surface; and an inner flat plane; wherein the trunnion defines a pivot hole and a crossing lubrication hole; and the trunnion is obtained by supporting a trunnion material taking the oblique surface or the bottom surface as a machining reference and taking one of the end surface and the inclining end surface as an axial positioning reference, and by machining the trunnion material to form the inner flat surface, the pivot hole and the crossing lubrication hole of the trunnion while keeping the trunnion material retained.

Preferably, the trunnion further defines a power roller pocket; and the trunnion is obtained by subjecting the trunnion material to machining while keeping the trunnion material retained to form the power roller pocket in addition to the inner flat plane, the pivot hole and the crossing lubrication hole.

Preferably, a pair of inclining shafts of the trunnion are formed by turning taking the inner flat plane and pivot hole that are machined as a machining reference.

Preferably, the trunnion further includes: a wire stopper; and an inclination stopper; wherein the trunnion defines a lubrication hole and a shaft insertion hole; at least one of the lubrication hole, the shaft insertion hole, the wire stopper and the inclination stopper of the trunnion is formed while retaining the trunnion material taking the inner flat plane and the pivot hole that are machined as a machining reference and taking the inclining shaft that is machined as a phase reference around the pivot hole.

Preferably, the inner flat plane, the pivot hole and the cross lubrication hole are machined by one of milling and turning.

Preferably, the power roller pocket is machined by one of milling and turning.

The invention provides a method of manufacturing a trunnion for toroidal continuously variable transmission, wherein the trunnion including: an oblique surface, a bottom surface, an inclining shaft having an end surface and an inclining end surface, a pivot hole, an inner flat plane, and a crossing lubrication hole, the method including: supporting a trunnion material by taking the oblique surface or the bottom surface as a machining reference and by taking one of the end surface and the inclining end surface as an axial positioning reference; and machining the trunnion material to form the inner flat surface, the pivot hole and the crossing lubrication hole of the trunnion while keeping the trunnion material retained.

Preferably, the trunnion further includes a power roller pocket; and the machining step includes machining the trunnion material to form the power roller pocket while keeping the trunnion material retained.

Preferably, the method further includes: turning a pair of inclining shafts of the trunnion while taking the inner flat plane and pivot hole that are machined as a machining reference.

Preferably, the turning step includes: supporting the trunnion material by the use of a chuck device provided with a mechanism having a reference washer contactable with the inner flat plane, the reference washer rotatable within at least 180 degrees around an axis orthogonal to a main shaft of a working machine; and turning the pair of inclining shafts while keeping the trunnion material retained.

Preferably, the method further includes: machining at least one of a lubrication hole, a shaft insertion hole, a wire stopper, and an inclination stopper of the trunnion while retaining the trunnion material taking the inner flat plane and the pivot hole that are machined as a machining reference and taking the inclining shaft that is machined as a phase reference around the pivot hole.

Preferably, the machining step includes: supporting the trunnion material taking the inner flat plane and the pivot hole that are machined as the machining reference and taking the inclining shaft that is machined as the phase reference around the pivot hole; and machining the lubrication hole, the shaft insertion hole, the wire stopper, and the inclination stopper at one chuck while keeping the trunnion material retained.

Preferably, the machining step includes machining the inner flat plane, the pivot hole and the cross lubrication hole by one of milling and turning.

Preferably, the step of machining the trunnion material includes forming the power roller pocket by one of milling and turning.

BRIEF DESCRIPTION OF THE DRAWINGS

The present invention may be more readily described with reference to the accompanying drawings, in which:

FIGS. 1A and 1B are diagrams illustrating a first step in the working method according to a first embodiment of implementation of the invention wherein FIG. 1A is a plan view of the first step and FIG. 1B is a side view of the first step;

FIGS. 2A and 2B are diagrams illustrating a second step in the working method according to the first embodiment of implementation of the invention wherein FIG. 2A is a plan view of the second step and FIG. 2B is a side view of the second step;

FIGS. 3A and 3B are diagrams illustrating a third step in the working method according to the first embodiment of implementation of the invention wherein FIG. 3A is a plan view of the third step and FIG. 3B is a side view of the third step;

FIGS. 4A and 4B are diagrams illustrating a fourth step in the working method according to the first embodiment of implementation of the invention wherein FIG. 4A is a plan view of the fourth step and FIG. 4B is a side view of the fourth step;

FIGS. 5A and 5B are diagrams illustrating a fifth step in the working method according to the first embodiment of implementation of the invention wherein FIG. 5A is a plan view of the fifth step, FIG. 5B is a side view of the fifth step and FIG. 5C is a top plan view of the trunnion;

FIGS. 6A and 6B are diagrams illustrating a sixth step in the working method according to the first embodiment of implementation of the invention wherein FIG. 6A is a plan view of the sixth step and FIG. 6B is a side view of the sixth step;

FIGS. 7A and 7B are diagrams illustrating the working method according to a second embodiment of implementation of the invention wherein FIG. 7A is a diagram illustrating a second step of the working method and FIG. 7B is a diagram illustrating a third step of the working method;

FIGS. 10A-10C are diagrams illustrating a table on which the five-axis machining center according to the third embodiment of implementation of the invention is mounted wherein FIG. 10A is a top plan view of the table, FIG. 10B is a front elevation of the table and FIG. 10C is a side view of the table;

FIG. 12 is a sectional view illustrating the configuration of an ordinary toroidal continuously variable transmission;

FIGS. 13A-13D are diagrams illustrating the trunnion of FIG. 12 wherein FIG. 13A is a top plan view of the trunnion,
FIG. 13B is a sectional view of the trunnion, FIG. 13C is a left side view of the trunnion and FIG. 13D is a right side view of the trunnion;

FIGS. 14A and 14B are diagrams illustrating how one inclining shaft of a related art trunnion is formed by lathe turning wherein FIG. 14A is a sectional view of the lathe turning process and FIG. 14B is a side view of the lathe turning process;

FIGS. 15A and 15B are diagrams illustrating how the other inclining shaft of the related art trunnion is formed by lathe turning wherein FIG. 15A is a sectional view of the lathe turning process and FIG. 15B is a side view of the lathe turning process; and FIGS. 16A and 16B are diagrams illustrating how the inner flat plane and the pivot hole of the related art trunnion are formed by milling where FIG. 16A is a sectional view of the milling process and FIG. 16B is a side view of the milling process.

DETAILED DESCRIPTION OF THE PREFERRED EMBODIMENTS

A method of forming a trunnion according to the first embodiment of implementation of the invention will be described hereinafter in connection with the attached drawings. The trunnions formed in the various embodiments have a structure which is the same as or identical to that of the trunnion 30 described in the background art. Where the parts are the same as those of the trunnion 30 described in the background art, the same numbers are used. Duplicated description will be omitted or simplified.

Figure 1A:
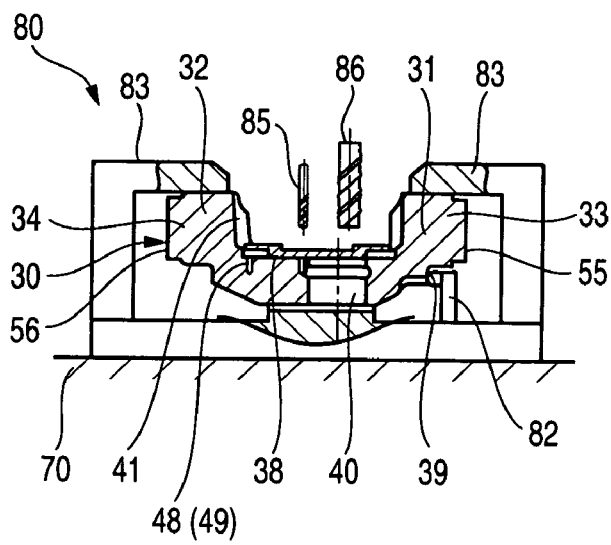
Figure 1B:
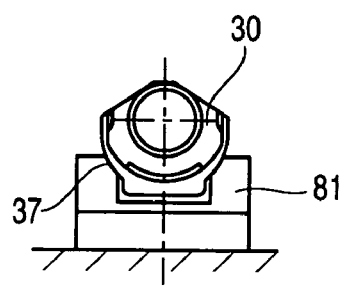

FIGS. 1A and 1B illustrate a first step of forming the inner flat plane 38, the pivot hole 40, the crossing lubrication holes 48, 49 and the power roller pocket 41 of the trunnion 30.

As shown in FIGS. 1A and 1B, a trunnion working tool 80 comprises a V-shaped receiving portion 81 provided with a work reference surface having the same inclination angle as that of the oblique surface 37 of the trunnion 30 for placing the trunnion 30 thereon, an axial stopper 82 for making axial positioning of the trunnion 30 and a pair of clamps 83 in contact with offset portions 33, 34 for fixing the trunnion 30 disposed on the V-shaped receiving portion 81. The trunnion working tool 80 is placed on the surface of the table 70 of a machining center during working.

Firstly, a trunnion material which has been formed into an outline by hot forging is placed on the V-shaped receiving portion 81 in such an arrangement that the oblique surface 37 comes in contact with the work reference surface of the V-shaped receiving portion 81. Further, by bringing the inclining end surface 39 of one of the inclining shafts 31, 32 (inclining shaft 31 in the present embodiment) into contact with the axial stopper 82, the trunnion 30 is axially positioned. Thereafter, by brining the clamp 83 into contact with the inner surface of the offset portions 33, 34, the trunnion 30 is retained.

Subsequently, while the working tool 80 is being placed on the surface of the table 70 of the machining center with the trunnion 30 retained thereon, the trunnion 30 is subjected to milling by machining tools 85, 86 at one chuck without releasing the trunnion 30 in the course of working to form the inner flat surface 38, the pivot hole 40, the crossing lubrication holes 48, 49 and the power roller pocket 41.

The axial positioning of the trunnion 30 may be carried out by brining the axial stopper 82 into the end surfaces 55, 56 of any one of the pair of inclining shafts 31, 32 instead of the inclining end surface 39. The driving of the clamp 83 may be carried out manually, pneumatically, hydraulically or otherwise. In addition, the process of milling to form the inner flat surface 38, the pivot hole 40, the crossing lubrication holes 48, 49 and the power roller pocket 41 can be substituted by turning.

Figure 2A:
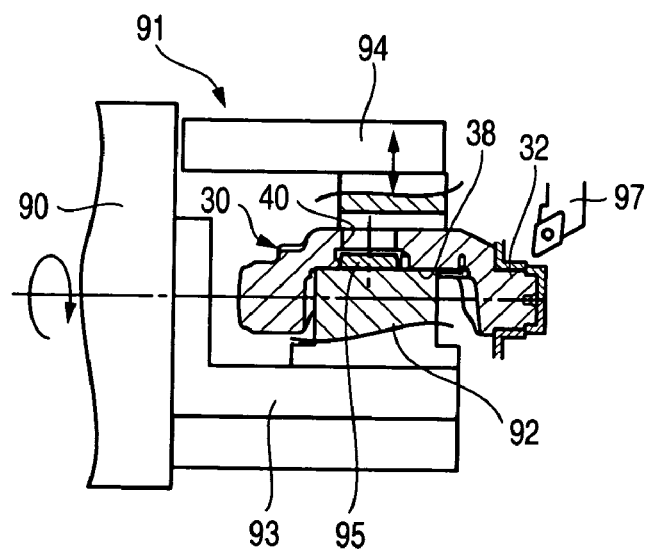
Figure 2B:
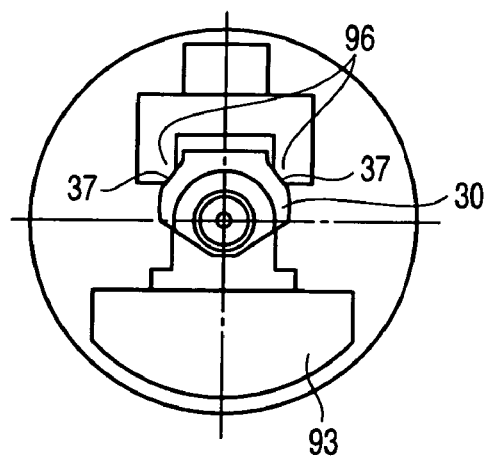

FIGS. 2A and 2B illustrates a second step of forming the inclining shaft 32, which is one of the pair of inclining shafts 31, 32.

A chuck device 91 attached to the main shaft 90 of an NC lathe, which is a working machine, comprises a chuck body 93 having a reference washer 92 mounted thereon and a clamp 94 which can move toward the reference washer 92 at a predetermined stroke. On the reference washer 92 is disposed a pivot hole guide boss 95 which engages with the pivot hole 40 of the trunnion 30. Provided at the forward end of the clamp 94 is a crank pawl 96 which can come in contact with the oblique surface 37 of the trunnion 30.

At the second step, the trunnion 30 is placed on the chuck device 91 while the inner flat plane 38 is in contact with the flat plane of the reference washer 92 with the pivot hole 40 fitted on the pivot hole guide boss 95. Subsequently, the clamp 94 is moved toward the trunnion 30 with the clamp pawl 96 in contact with the oblique surface 37. In this manner, the trunnion 30 is retained. In this arrangement, when the main shaft 90 of the lathe is rotationally driven, the trunnion 30 is then lathe-turned by a cutting bite 97 to form one inclining shaft 32.

Accordingly, at the second step, the trunnion 30 is lathe-turned with the inner flat surface 38 and pivot hole 40 formed with a high precision at the first step as a work reference while being retained on the main shaft 90 of the NC lathe to form one inclining shaft 32.

Figure 3A:
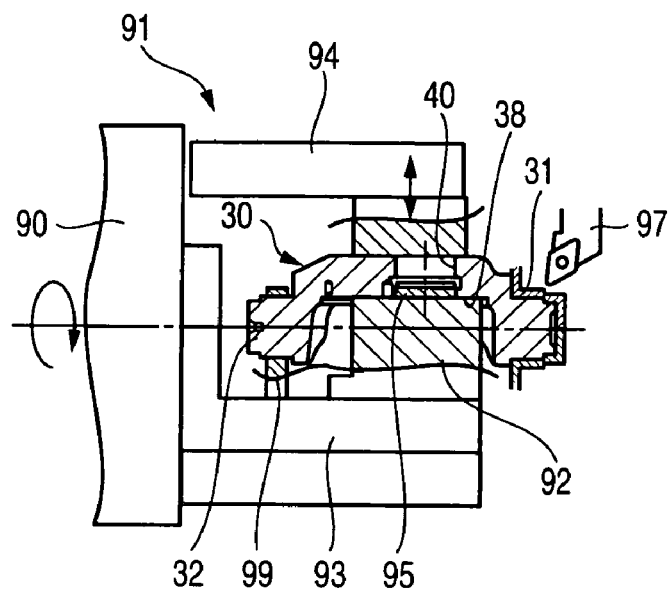
Figure 3B:
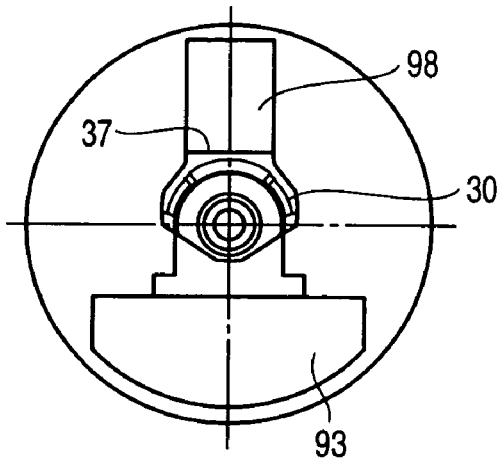

FIGS. 3A and 3B illustrates a third step of forming the inclining shaft 31, which is the other of the pair of inclining shafts 31, 32.

The chuck device 91 used at the third step comprises a chuck body 93 on which a reference washer 92 having a pivot hole guide boss 95 disposed thereon is mounted and a clamp 94 which can move toward the reference washer 92 at a predetermined stroke as in FIGS. 2A and 2B. The clamp 94 has a clamp pawl 98 at the forward end thereof which comes in contact with the bottom 36 of the trunnion 30. The chuck body 93 comprises a pivot hole peripheral phase positioning mechanism 99 for clamping the inclining shaft to position the phase around the pivot hole of the trunnion 30.

At the third step, the trunnion 30 is placed on the chuck device 91 while the inner flat plane 38 being in contact with the flat plane of the reference washer 92 with the other inclining shaft 31 positioned outside the main shaft 90 and the pivot hole 40 fitted on the pivot hole guide boss 95. The one inclining shaft 32 thus formed is clamped in the pivot hole peripheral phase positioning mechanism 99. The clamp pawl 98 is then moved toward the bottom 36 of the trunnion 30. In this manner, the trunnion 30 is retained. In this arrangement, when the main shaft 90 of the lathe is rotationally driven, the trunnion 30 is then lathe-turned by a cutting bite 97 to form the other inclining shaft 31.

Accordingly, at the third step, the trunnion 30 is lathe-turned with the inner flat surface 38 and pivot hole 40 formed with a high precision at the first step as a work reference and with the one inclining shaft 32 formed at the second step as a pivot hole peripheral phase positioning reference while being retained on the main shaft 90 of the NC lathe to form the other inclining shaft 31.

This step may be effected involving the formation of a piston insertion hole 46 as well.

Figure 4A:
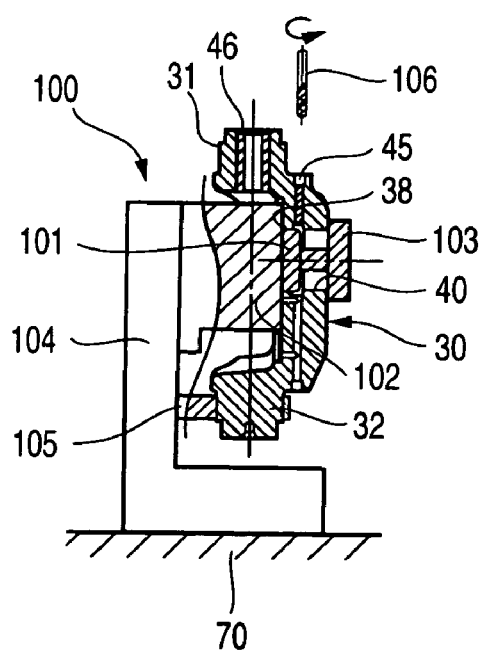
Figure 4B:
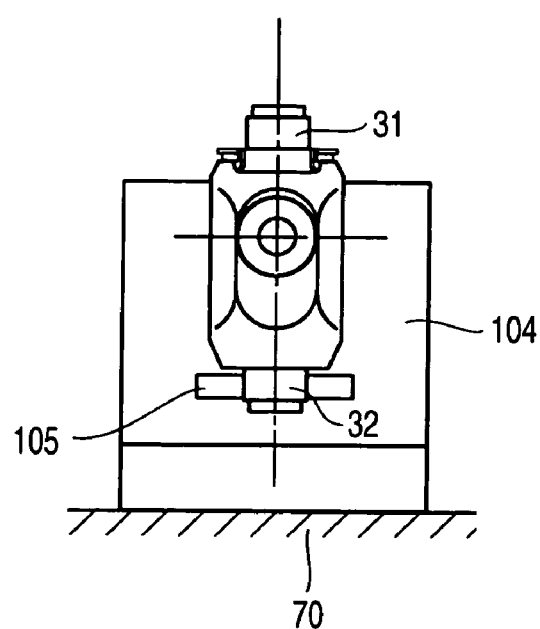

FIGS. 4A and 4B illustrates a fourth step of forming a part of the lubrication hole 44 and the shaft insertion hole 46 of the trunnion 30 by milling.

A machining tool 100 shown in FIGS. 4A and 4B comprises a reference washer 102 having a pivot hole guide boss 101 disposed thereon and a base table 104 having a crank 103 provided thereon which can move in such a direction that the trunnion 30 is grasped with respect to the reference washer 102. The base table 104 has a phase positioning mechanism 105 mounted thereon for clamping one of the inclining shafts (inclining shaft 32 in the present embodiment). The base table 104 is placed on the surface of the table 70 of the machining center during working.

At the fourth step, the trunnion 30 is placed on the machining tool 100 while one inclining shaft 32 is being supported by the phase positioning mechanism 105 with the pivot hole 40 of the trunnion 30 fitted on the pivot hole guide boss 101 and with the inner flat plane 38 in contact with the flat plane of the reference washer 102. In this arrangement, when the clamp 103 is moved toward the reference washer 102, the trunnion 30 is then retained.

Subsequently, the trunnion 30 is subjected to drilling and milling while the machining tool 100 having the trunnion 30 retained thereon is being placed on the surface of the table 70 of the machining center with the trunnion 30 erected. In particular, at this step, a machining drill 106 is used to form a part of the lubrication hole 44 on the part of the other inclining shaft 31, i.e., a part of first lubrication hole 45 and the shaft insertion hole 46 by milling.

Accordingly, at the fourth step, the trunnion 30 is subjected to milling with the inner flat surface 38 and the pivot hole 40 as a work reference and with the one inclining shaft 32 as a pivot hole peripheral phase positioning reference while the machining tool 100 having the trunnion 30 retained thereon is being placed on the surface of the table 70 of the machining center to form the lubrication hole 44 and the shaft insertion hole 46.

Figure 5C:
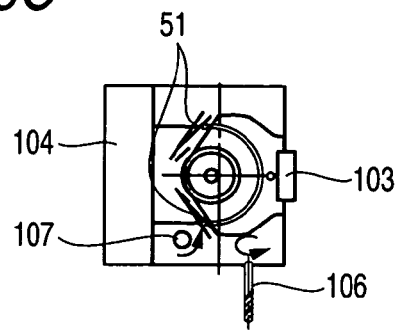
Figure 5A:
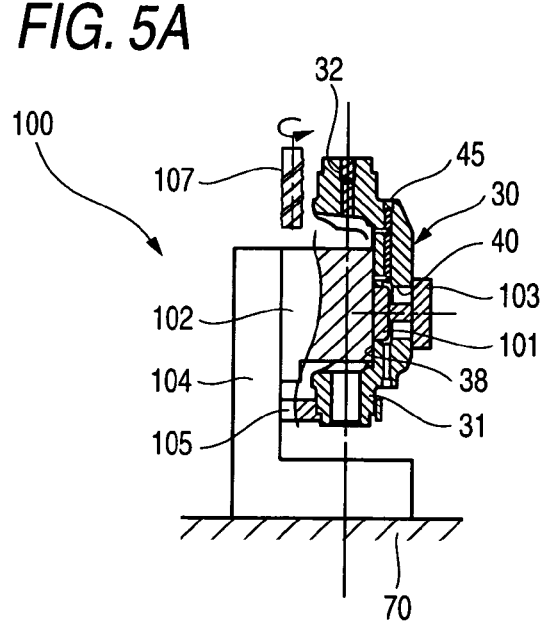
Figure 5B:
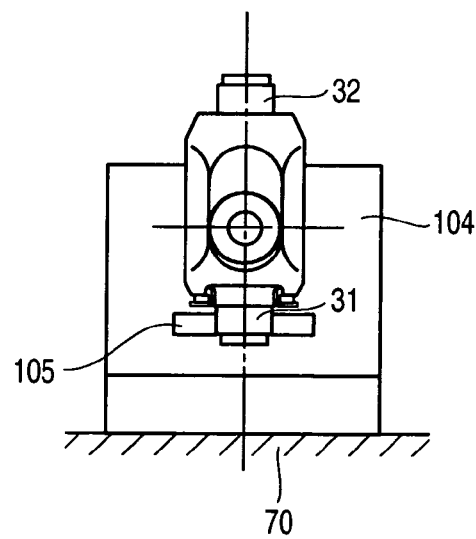

FIGS. 5A-5C illustrate a fifth step of forming the lubrication hole 44 on the other side of the trunnion and the inclination stopper 51 by milling.

At the fifth step, the machining tool 100 as used at the fourth step is used. The trunnion 30 is subjected to milling by machining drills 106, 107 while being retained inversed at 180 degrees to form the lubrication hole 44 on the part of the one inclining shaft 32, i.e., the rest part of first lubrication hole 45 and the inclination stopper 51.

Accordingly, at the fifth step, the trunnion 30 is subjected to milling with the inner flat plane 38 and the pivot hole 40 as a work reference and with the other inclining shaft 31 as a pivot hole peripheral phase positioning reference while the machining tool 100 having the trunnion 30 retained thereon is being placed on the surface of the table 70 of the machining center to form the lubrication hole 44 on the other side of the trunnion 30 and the inclination stopper 51.

Figure 6A:
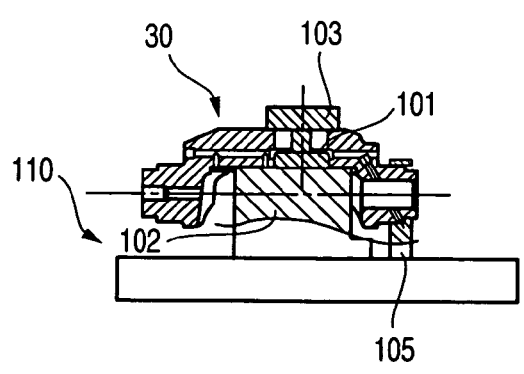
Figure 6B:
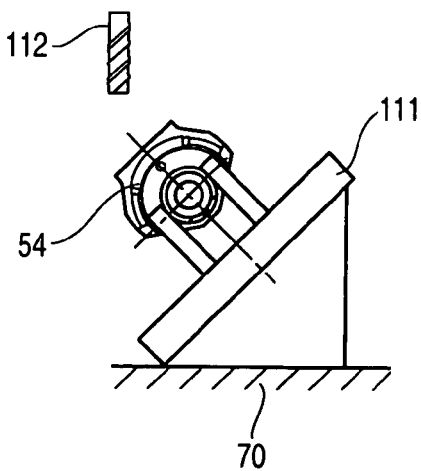

FIGS. 6A and 6B illustrate a sixth step of forming the wire stopper 54 of the trunnion by milling.

The machining tool 110 shown in FIGS. 6A and 6B has the pivot hole guide boss 101, the reference washer 102, the clamp 103 and the phase positioning mechanism 105 shown in FIGS. 4A-5C placed on a base table 111 which can incline with respect to the surface of the table 70 of the machining center.

At the sixth step, the trunnion 30 is retained on the machining tool 110 as the same work reference as used at the fifth step. Subsequently, the trunnion 30 is subjected to milling by a machining drill 112 while the machining tool 110 is being mounted on the surface of the table 70 of the machining center at an inclination angle which is the same as the angle of the wire stopper 54.

At the first to sixth steps, the structure of the various fixtures for supporting the site of the trunnion 30 which is a work reference can be the same. In other words, the reference washers 92, 102, the pivot hole guide bosses 95, 101 and the phase positioning mechanisms 99, 105 which come in contact with the trunnion 30 can be all common to these steps.

In accordance with the present embodiment, at the first step, the trunnion 30 is subjected to milling at one chuck while keeping the trunnion 30 retained, i.e., without releasing the trunnion 30 in the course of working to form the inner flat plane 38, the pivot hole 40, the crossing lubrication holes 48, 49 and the power roller pocket 41. In this manner, the error in the rectangularity of the inner flat plane 38 with the pivot hole 40 can be theoretically zero and the inner flat plane 38 and the pivot hole 40 can be formed with a high precision in their positional relationship. In accordance with the invention, at least the inner flat plane 38 and the pivot hole and at least one of the crossing lubrication holes 48, 49 can be formed by milling while keeping the trunnion 30 retained, making it possible to attain the effect of the invention.

Further, since the oblique surface 37 of the trunnion 30 is used as a work reference, the distance between the oblique surface 37 and the inner flat plane 38 thus formed can be made constant. The work reference can be the bottom 36 instead of the oblique surface 37 of the trunnion 30. The oblique surface 37 which is a work reference may have been subjected to cold working or cutting in the previous process as disclosed in JP-A-2002-336928 cited above to enhance its surface precision. 0

Moreover, at the second and third steps in the present embodiment, the trunnion 30 is lathe-turned with the inner flat plane 38 and the pivot hole 40 which have been formed with the same work reference at the first step as a work reference to form a pair of inclining shafts 31, 32. Accordingly, the reproducibility in mounting of trunnion can be enhanced as compared with the case where the trunnion is mounted on the machining tool with the forged surface as a work reference, making it possible to enhance the parallelism of the center of the two inclining shafts to the inner flat plane 38 which is a work reference.

Further, at the fourth to sixth steps in the present embodiment, the trunnion 30 is subjected to milling with the inner flat plane 38 and the pivot hole 40 as a work reference and with the inclining shafts 31, 32 formed at the second and third steps as a pivot hole peripheral phase reference using the machining tools 100, 110 for retaining the trunnion 30 to form the other functional sites of the trunnion 30 such as lubrication hole 44, e.g., first and second lubrication holes 45, 46, shaft insertion hole 45, wire stopper 54 and inclination stopper 51.

Accordingly, these functional sites can be formed by milling with the same reference, making it possible to enhance the precision in their positional relationship. The machining tools for forming these functional sites retain the trunnion with the same reference. Therefore, the same machining tool can be used to form these functional sites. Thus, the production cost of machining tool can be reduced.

A method of forming a trunnion according to the second embodiment of implementation of the invention will be described hereinafter. Where the parts are the same as those in the first embodiment of implementation of the invention, the same numerals are used. Duplicated description will be omitted or simplified.

The present embodiment provides an improvement of the chuck device 91 used at the second and third steps in the first embodiment.

Figure 7A:
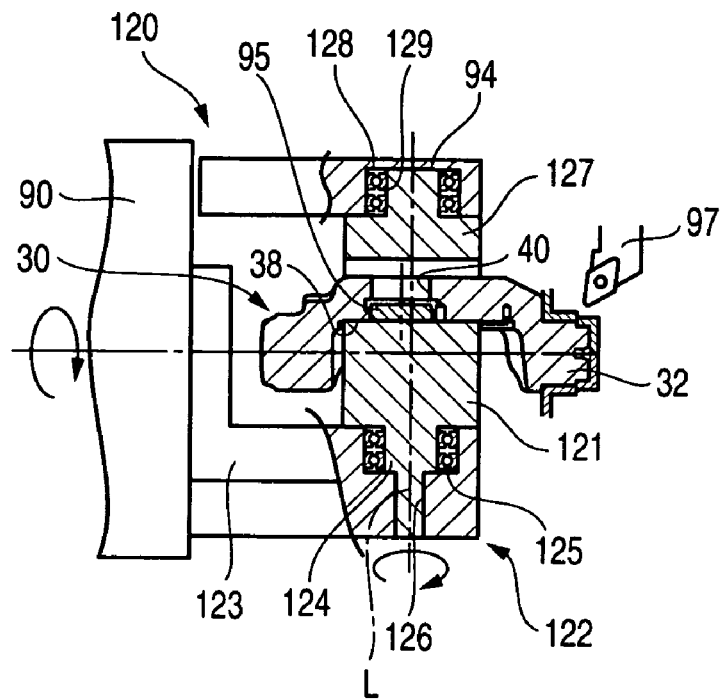
Figure 7B:
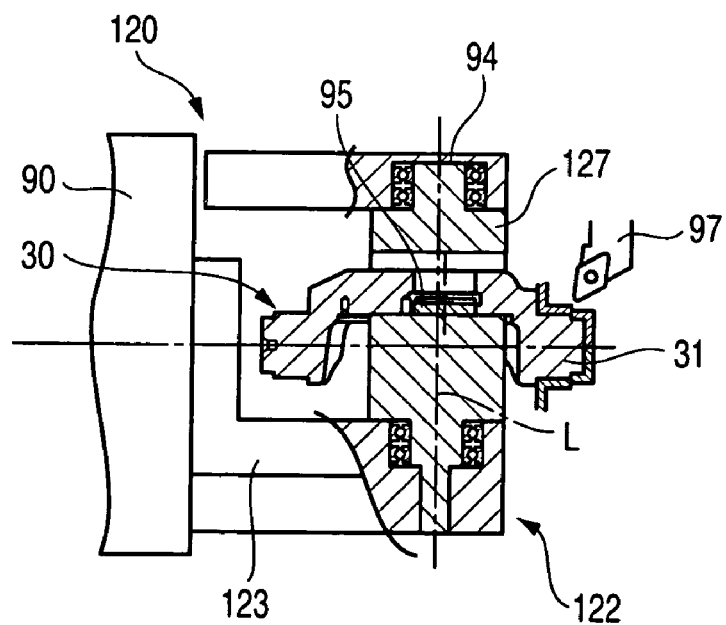

As shown in FIG. 7A, the chuck device 120 disposed on the main shaft 90 of the lathe has a 180 degree inversion mechanism 122 provided on the clamp 94 and the chuck body 123 which allows the reference washer 121 to rotate in any direction at 180 degrees on an axis L which crosses the main shaft 90 as well as the inner flat plane 38 at right angle. The 180 degree inversion mechanism 122 is arranged such that it can be fixed at a position accurately calculated every 180 degrees.

The 180 degree inversion mechanism 122 rotatably bears a rotary shaft 124 formed integrally with the reference washer 121 and extending downward from the reference washer 121 on an indentation 126 formed in the chuck body 123 via a bearing 125. The 180 degree inversion mechanism 122 also rotatably bears the clamp pawl 127 on an indentation 129 formed in the clamp 94 via a bearing 128 in such an arrangement that the clamp pawl 127 which can come in contact with the oblique surface 37 of the trunnion can rotate synchronously with the rotary shaft 124.

Provided above the reference washer 121 is the pivot hole guide boss 95. In this arrangement, the trunnion 30 can be retained with the inner flat plane 38 and the pivot hole 40 of the trunnion 30 as a work reference as in the second and third steps of the first embodiment.

At the second and third steps of the second embodiment, one inclining shaft 32 is formed by lathe turning. Thereafter, the 180 degree inversion mechanism 122 causes the trunnion 30 to make index rotation at 180 degrees while keeping the trunnion 30 retained. Subsequently, the other inclining shaft 31 is formed by lathe turning at a site calculated by the 180 degree inversion mechanism 122.

Accordingly, the pair of inclining shafts 31, 32 can be formed at one chuck with the inner flat plane 38 and the pivot hole 40 as a work reference while keeping the trunnion 30 retained, making it possible to enhance the precision in the coaxiality of the pair of inclining shafts.

The other structures and actions are the same as in the first embodiment.

A method of forming a trunnion according to the third embodiment of implementation of the invention will be described hereinafter. Where the parts are the same as those in the first embodiment of implementation of the invention, the same numerals are used. Duplicated description will be omitted or simplified.

Figure 8A:
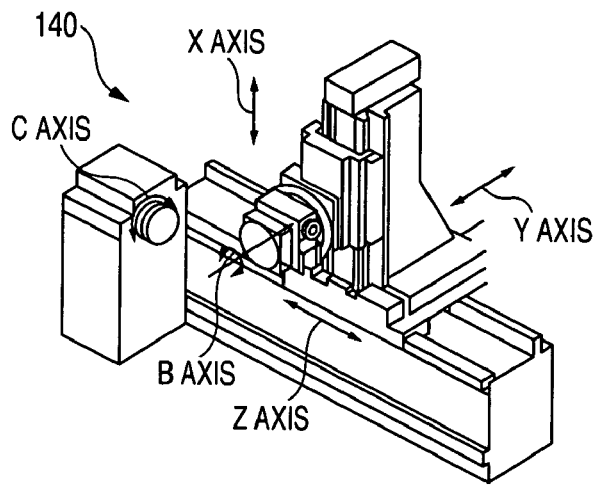
FIGS. 8A-8C are diagrams illustrating a composite working machine according to a third embodiment of implementation of the invention.
Figure 8B:
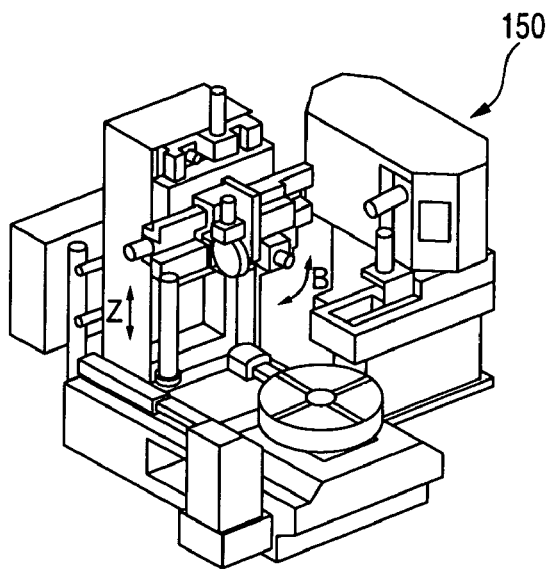
Figure 8C:
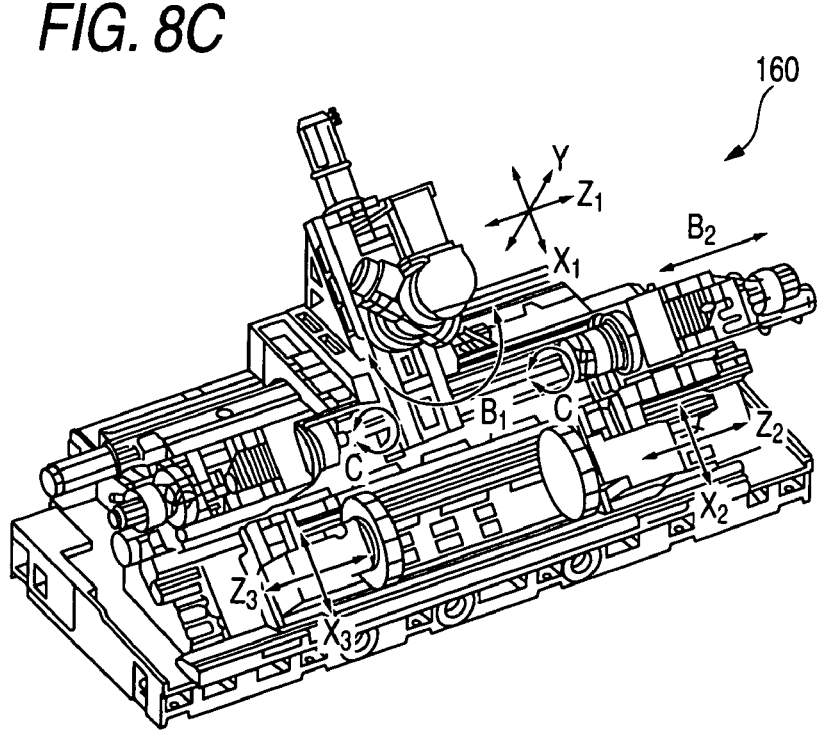

The machining tools 100, 110 used at the fourth to sixth steps of the first embodiment can be mounted on the table of composite working machines 140, 150 and 160 shown in FIGS. 8A-8C or five-axis machining centers 170, 180, 190, 200 and 210 shown in FIGS. 9A-9F to change the attitude of the trunnion 30. In this arrangement, sites of the trunnion 30 other than the inner flat plane 38, the pivot hole 40, the crossing lubrication holes 48, 49, the power roller pocket 41 and the inclining shafts 31, 32, i.e., first lubrication hole 45, second lubrication hole 46, inclination stopper 51, wire stopper 54 can be formed at one chuck while keeping the trunnion 30 retained.

Figure 9E:
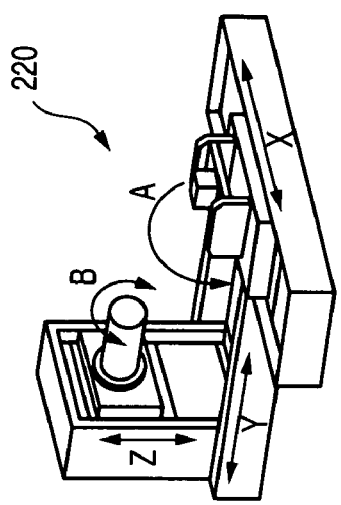
FIGS. 9A-9F are diagrams illustrating a five-axis machining center according to the third embodiment of implementation of the invention.
Figure 9F:
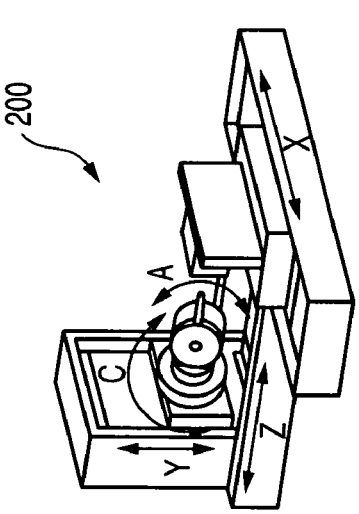
Figure 9C:
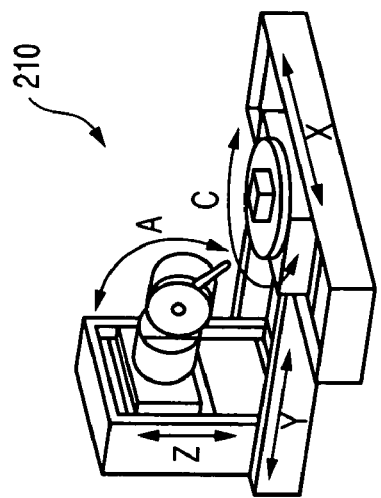
Figure 9D:
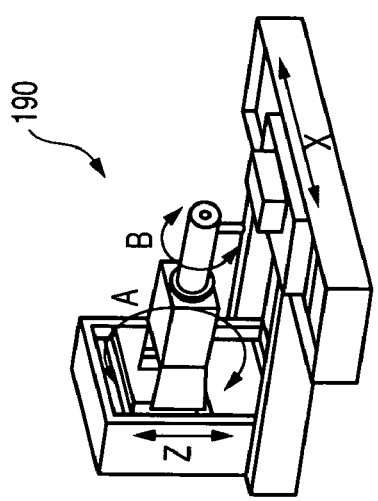
Figure 9A:
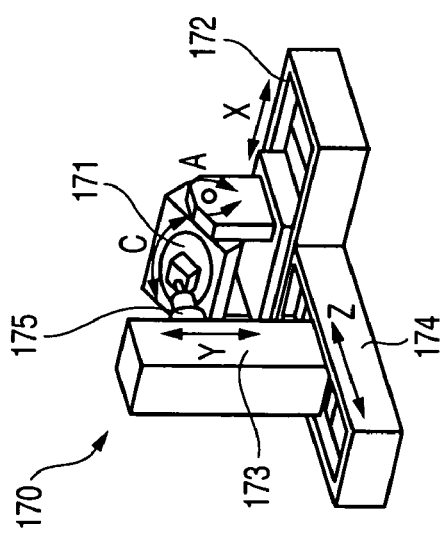
Figure 9B:
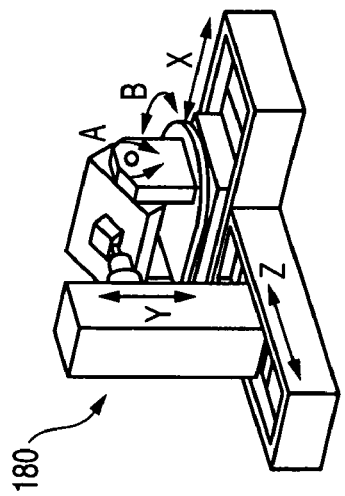
Figure 10A:
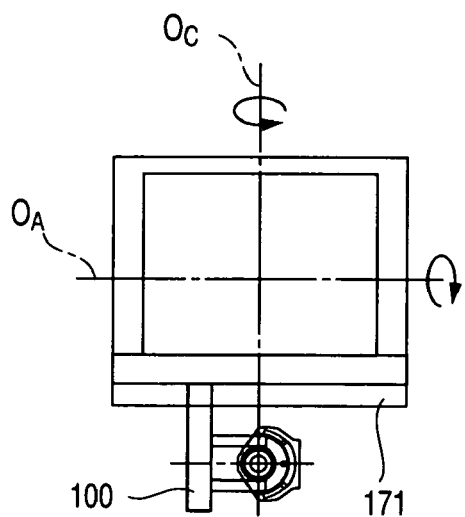
Figure 10B:
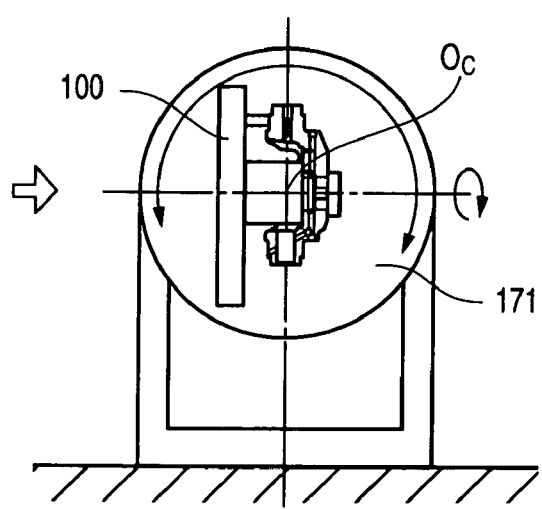
Figure 10C:
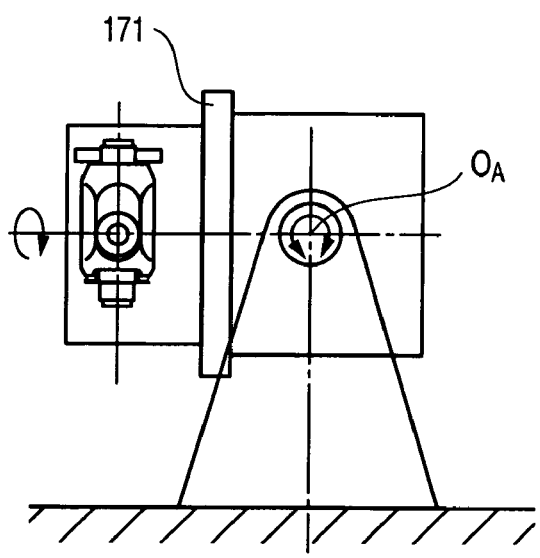

FIGS. 10A-10C illustrate an example of the mounting of the machining tool 100 on a table 171 provided with the inclining shaft A and the rotary shaft C of the five-axis machining tool 170 shown in FIG. 9A.

Figure 11:
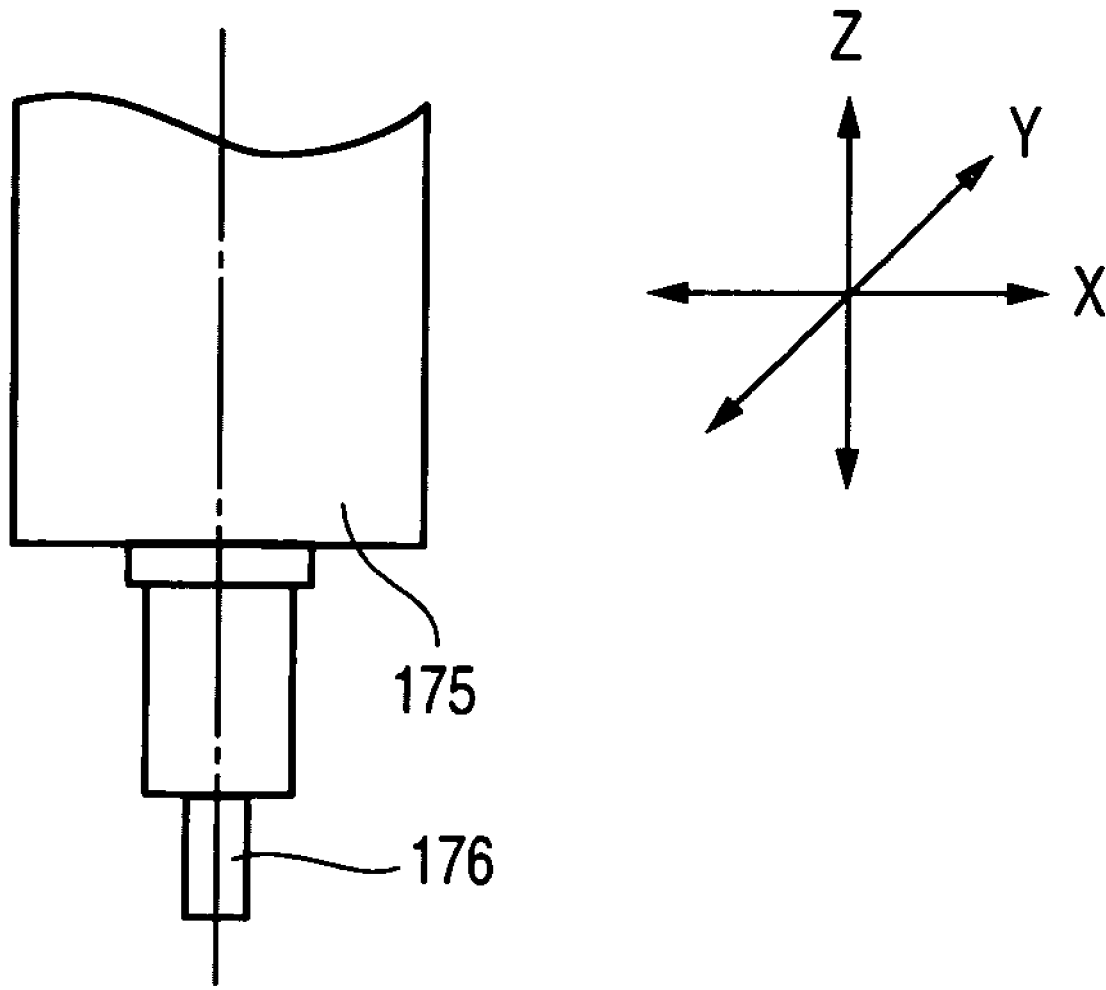
FIG. 11 is a diagram illustrating the main shaft of the five-axis machining center according to the third embodiment of implementation of the invention.
Figure 13D:
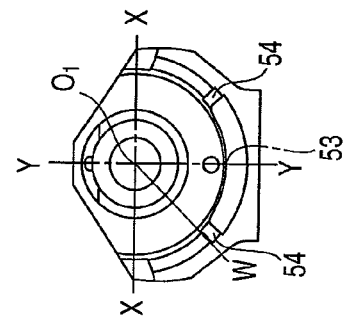
Figure 13A:
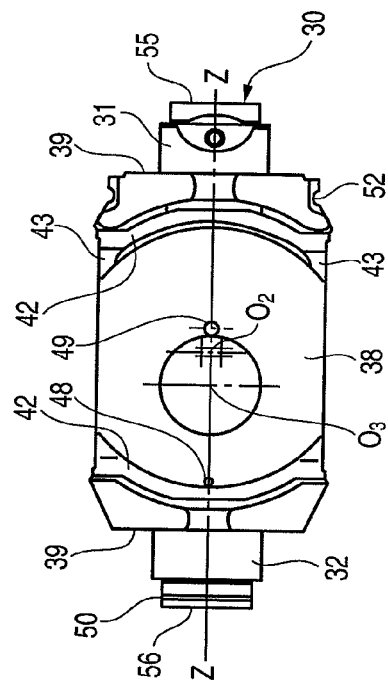
Figure 13B:
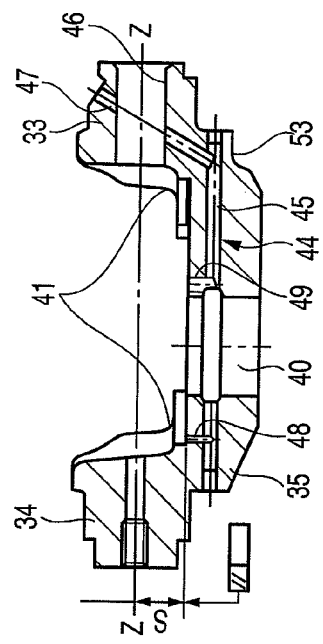
Figure 13C:
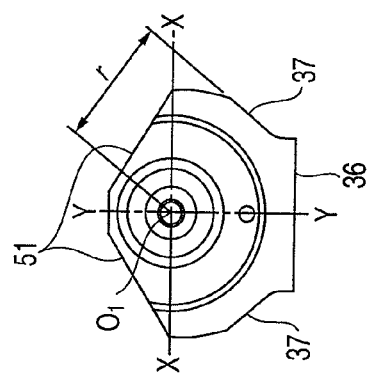
Figure 14A:
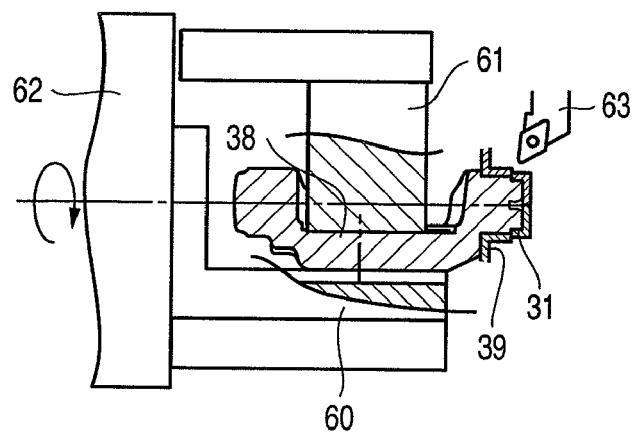
Figure 14B:
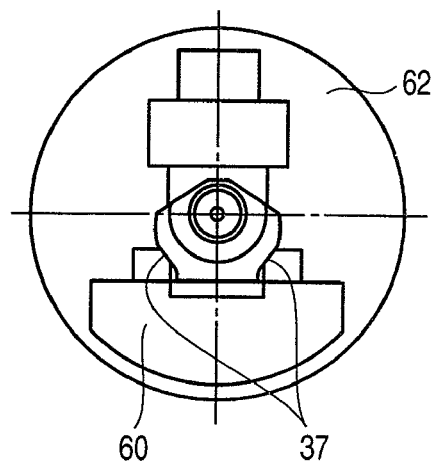
Figure 15A:
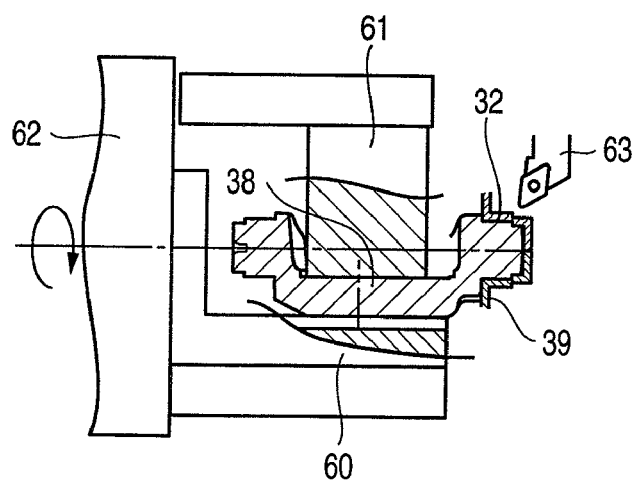
Figure 15B:
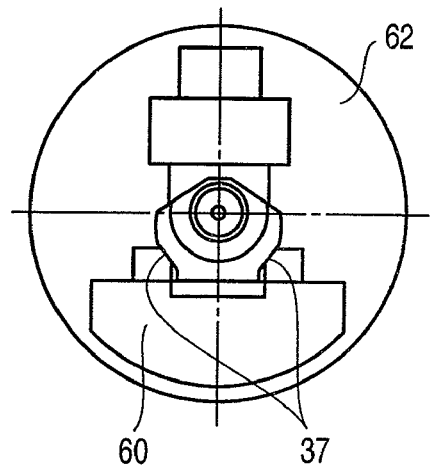

As shown in FIG. 10B, the table 171 can rotate on the center Oc of rotation of the rotary shaft C at 360 degrees. As shown in FIG. 10C, the table 171 can also turn around the center Oa of turning of the inclining shaft A at 90 degrees or more. On the other hand, the five-axis machining center 170 comprises mechanisms 172, 173 and 174 for driving in three crossing directions X, Y and Z, respectively (see FIG. 9A). A main shaft 175 which rotatably bears a milling tool 176 is disposed in such an arrangement that it can move relative to the trunnion 30 retained on the machining tool 100 in the three crossing directions X, Y and Z as shown in FIG. 11.

In other words, by turning the table 171 around the rotary shaft C at 360 degrees, the five-axis machining center 170 can dispose one inclining shaft 32 at the end surface and back surface thereof and the other inclining shaft 31 at the end surface thereof opposed to the main shaft 175, respectively. Further, by turning the table 171 around the inclining shaft A at 90 degrees or more, the machining center 170 can position the trunnion 30 at an arbitrary angle.

Accordingly, by positioning the rotary shaft C and the inclining shaft A in combination, the trunnion 30 can be worked by the machining tool 100 from any direction except at sites which cannot be accessed by the milling tool 176.

While the present embodiment has been described with reference to the case where the table 171 is provided with the rotary shaft C and the inclining shaft A and the machining tool 100 is mounted on the five-axis machining center 170 the main shaft 175 of which can move relative to the table 171 in X, Y and Z directions, the same effect can be exerted with the other five-axis machining centers 180, 190, 200, 210 and 220 wherein the moving axes X, Y and Z, the rotary shaft C and the inclining shaft A are provided on any of the table 171 and the main shaft 175 as shown in FIG. 9A. Further, the same effect can be exerted with the case where the machining tool 100 is provided on the composite working machines 140, 150 and 160 shown in FIGS. 8A-8C.

Accordingly, in accordance with the present embodiment, one fixture which is one work reference can be mounted on a composite working machine or five-axis machining center to make one-chuck working, making it possible to prevent the entrance of foreign matters accompanying the attachment and detachment of the trunnion 30 and hence further enhance the precision in the positional relationship between the worked sites. Further, in this case, the required number of working steps can be reduced to reduce the number of attachment and detachment of the trunnion. Further, the cost of transportation from step to step can be eliminated, making it possible to reduce the working cost.

The invention is not limited to the aforementioned embodiments, but proper changes, modifications and improvements can be made therein.

In accordance with the invention, a method of manufacturing a trunnion for toroidal continuously variable transmission can be provided which can produce a trunnion with a high precision at reduced cost without increasing the number of kinds of machining tools.

What is claimed is:

1. A method of manufacturing a trunnion, for toroidal continuously variable transmission, wherein the trunnion including: an oblique surface, a bottom surface, an inclining shaft having an end surface and an inclining end surface, a pivot hole, an inner flat plane, and a crossing lubrication hole, the method comprising:
   clamping a trunnion material by taking the oblique surface or the bottom surface as a machining reference and by taking one of the end surface and the inclining end surface as an axial positioning reference;
   machining the clamped trunnion material to form the inner flat plane, the pivot hole and the crossing lubrication hole of the trunnion; and
   turning a pair of inclining shafts of the trunnion while taking the inner flat plane and pivot hole that are machined as a machining reference.

2. The method of manufacturing the trunnion as claimed in claim 1,
   wherein the turning step includes:
   supporting the trunnion material by the use of a chuck device provided with a mechanism having a reference washer contactable with the inner flat plane, the reference washer rotatable within at least 180 degrees around an axis orthogonal to a main shaft of a working machine; and
   turning the pair of inclining shafts while keeping the trunnion material retained.

3. A method of manufacturing a trunnion for toroidal continuously variable transmission, wherein the trunnion including: an oblique surface, a bottom surface, an inclining shaft having an end surface and an inclining end surface, a pivot hole, an inner flat plane, and a crossing lubrication hole, the method comprising:
   clamping a trunnion material by taking the oblique surface or the bottom surface as a machining reference and by taking one of the end surface and the inclining end surface as an axial positioning reference;
   machining the clamped trunnion material to form the inner flat plane, the pivot hole and the crossing lubrication hole of the trunnion; and
   machining at least one of a lubrication hole, a shaft insertion hole, a wire stopper, and an inclination stopper of the trunnion while retaining the trunnion material taking the inner flat plane and the pivot hole that are machined as a machining reference and taking the inclining shaft that is machined as a phase reference around the pivot hole.

4. The method of manufacturing the trunnion as claimed in claim 3,
   the machining step includes:
   machining the lubrication hole, the shaft insertion hole, the wire stopper, and the inclination stopper at one chuck while keeping trunnion material retained.

* * * * *